(12) United States Patent
Niklasson

(10) Patent No.: US 7,093,050 B2
(45) Date of Patent: Aug. 15, 2006

(54) CONTROL ARRANGEMENT

(75) Inventor: Henrik Niklasson, Uddevalla (SE)

(73) Assignee: Empir AB, Uddevalla (SE)

( * ) Notice: Subject to any disclaimer, the term of this patent is extended or adjusted under 35 U.S.C. 154(b) by 347 days.

(21) Appl. No.: 10/035,088

(22) Filed: Dec. 28, 2001

(65) Prior Publication Data
US 2002/0147874 A1    Oct. 10, 2002

Related U.S. Application Data

(60) Provisional application No. 60/258,772, filed on Dec. 29, 2000.

(51) Int. Cl.
  G06F 3/00    (2006.01)
  G06F 3/02    (2006.01)
  G06F 13/42   (2006.01)
  G06F 13/00   (2006.01)
  G06F 13/36   (2006.01)

(52) U.S. Cl. .................... 710/305; 710/300; 710/3; 710/40; 710/105

(58) Field of Classification Search ............... 710/300, 710/3, 105, 40, 305; 370/460
See application file for complete search history.

(56) References Cited

U.S. PATENT DOCUMENTS

| | | | |
|---|---|---|---|
| 5,001,642 A | | 3/1991 | Botzenhardt et al. |
| 5,469,150 A | | 11/1995 | Sitte |
| 5,675,830 A | | 10/1997 | Satula |
| 6,025,655 A | * | 2/2000 | Hopf .................... 307/10.2 |
| 6,067,302 A | * | 5/2000 | Tozuka ................. 370/464 |
| 6,111,888 A | * | 8/2000 | Green et al. .......... 370/461 |
| 6,164,920 A | * | 12/2000 | Nazarian et al. ......... 417/4 |
| 6,373,376 B1 | * | 4/2002 | Adams et al. ....... 340/310.01 |
| 6,525,432 B1 | * | 2/2003 | Heckmann et al. ...... 307/10.1 |
| 6,526,460 B1 | * | 2/2003 | Dauner et al. ............ 710/65 |
| 6,587,900 B1 | * | 7/2003 | Wischinski .............. 710/68 |
| 6,687,772 B1 | * | 2/2004 | Eidson ..................... 710/65 |

FOREIGN PATENT DOCUMENTS

WO    WO 99/146643    3/1999

OTHER PUBLICATIONS

Philips Semiconductor, PCA82C250 CAN Controller interface data sheet, Oct. 21, 1997.*
Philips Semiconductor, PCA82C250/251 CAN Transeiver, AN96116, 1996.*
"The Application of DeviceNet in Process Control," Biegacki et al: *ISA Transactions*. 35 (1996) 169-176.
"Introduction To Device Net Safety"; Schiffer et al., WFCS-2000, Sep. 6-8, Porto, Portugal; pp. 293-300.

* cited by examiner

*Primary Examiner*—John R. Cottingham
*Assistant Examiner*—Christopher Daley
(74) *Attorney, Agent, or Firm*—Gauthier & Connors LLP

(57) ABSTRACT

The network arrangement includes at least one common bus. An input member is connected to the common bus. An output member is connected to the common bus. The input member comprises at least one input contact defined with a unique identity. The output member comprises at least one output contact defined with a unique identity. The input member is adapted to receive an input signal through the at least one input contact. The output member is adapted to provide an output signal through the at least one output contact. The input member is arranged to generate an action signal transmitted over the buss from the input member to the output member. The action signal comprises an address corresponding to the unique identity of an output contact.

21 Claims, 5 Drawing Sheets

CONTROL ARRANGEMENT

PRIORITY INFORMATION

This application claims priority from provisional application Ser. No. 60/258,772 filed Dec. 29, 2000.

TECHNICAL FIELD OF THE INVENTION

The present invention relates to a method and arrangement for controlling a plurality of devices connected to a controller bus.

BACKGROUND OF THE INVENTION

Presently, there are no commercial devices, which directly can be used in applications for controlling a number of devices in one or several spaces and specially allow a central control over a backbone control bus.

The available programmable units, e.g. for distributed I/O via a PLC, must be provided with additional fuses for each individual group and output circuit breakers to manage the consumer load. Moreover, these solutions require profound knowledge from the system architectures.

When controlling, for example analogues or serial signals, usually specially adapted devices are used. The information representation is normally limited since only few instruments can be coupled to the same signal. If additional signals are required, signal converters, amplifiers, etc. must be employed. If a signal must be scaled, more expensive apparatuses are needed.

The traditional installations use separate switching and fusing. Using distributed I/O units with output circuit breakers demands much more installation work, which consequently increases the interest of employing this technique. Moreover, the cost of the system usually makes it unbeneficial for small applications, which results in limited systems.

In applications where the output current is monitored, for example when the condition of a light bulb or the like is checked, usually a simple monitoring of an active output and keeping the current within a predetermined level is performed. If the light is on, then it will consume a specific amount of current, and if the current level is not correct then the light bulb is defected.

In applications, in which detector outputs are monitored in different points special dedicated detectors are arranged. It is also possible to read analogue/serial signals in a number of points without using signal converters or amplifiers. In addition, it is possible to convert the signals to adapt the measurement result from, for example a non-analogues detector to the used apparatuses. However, the adjustment for scaling with the aim of obtaining minimum/maximum values from a detector and displaying the minimum/maximum value on an instrument is usually eliminated. As an alternative, a non-liner instrument can be provided to compensate the incorrect signal received from a non-linear sensor.

FIG. 1 shows an embodiment according to the known technique. The system 10 comprises a number of central units 11 arranged in compartments 12a–12n. To each central unit 11 a power supply line 13 is connected. Each central unit 11 is connected to a switching arrangement 14 and supplies the devices (not shown) connected to each switching arrangement with power, preferably down (or up) transformed current/voltage. Each switching arrangement is connected to a controller unit 15, such as a Programmable Logic Controller (PLC). The PLC 15 controls the switching arrangement by sending control signals to the same, which connects or breaks the circuit including the controlled devices. Each PLC receives inputs from the controlled devices or other detectors, based on which input signals the devices can be controlled. The PLCs are controlled and programmed through a computer (PC) 16.

Other techniques are known. In U.S. Pat. No. 5,941,966, for example, a transmitter end stage for a data transmission system comprising at least one control unit and data transmission lines, especially for a CAN bus system having at least one CAN controller and one CAN bus (CB) is proposed, characterized by the fact that the individual circuit elements of transmitter end stage are integrated monolithically. As a result of the special layout and its circuit-design arrangement of the individual elements of the transmitter end stage, the effects of malfunctions, for example of short circuits of the data lines to ground or to the supply voltages, are reduced to a minimum.

As a result of the special choice of pre-drivers, minimum delay times are achieved, so that signals can be transmitted at a higher data rate.

WO 99/14643 discloses a loom control system in which a CAN bus, or other bus system, is extended by a daisy chain. After the loom has been switched on, or after a number of machine conditions, there is an initial automatic configuration of the internal and external units for the bus, and then the start is released for the daisy chain to be used for the configuration and, selectively, also as a trigger line. Fixed addresses are established for the operation of the units with the same function or to be bought in. The units with the same function have a group address for a multiple function, and each unit is assigned an additional number.

The international application no. WO 94/24618 relates to a centralized control logic device for a plurality of elements to be controlled. The device comprises a central controller having two input/output lines for transmitting and receiving data messages comprising an address, a control input means, a plurality of repeaters having first and second input/output terminals and by-pass input/output means. The repeaters are connected in series and form a ring control circuit with both ends connected to respective input/output lines and controllable automatic addressing units connecting by-pass input/output means to the elements to be controlled. The device may be used for controlling the various components.

In U.S. Pat. No. 5,001,642 a method is disclosed for the operation of a data processing system for motor vehicles including at least two computers and a line connecting the computers for the transmission of messages. An embodiment is provided which describes in detail the interface between the individual computers and the line linking the computers, and with the aid of which a controller-coupling is realized in the vehicle.

According to U.S. Pat. No. 5,675,830, a method and system is provided for assigning addresses to input/output (I/O) devices in a control network, and for verifying addresses assigned to the I/O devices. The system comprises a logic controller providing memory into which a connectivity map may be programmed. The connectivity map defines a specific expected address for each I/O device in the system. The logic controller further provides an external controller bus and logic for downloading the connectivity map to an I/O bus manager connected to the logic controller via the external controller bus. The I/O bus manager provides logic for assigning the specific addresses to the I/O devices. Network nodes connect the I/O bus manager to I/O cluster units in the system, each network node including a multiplexer for multiplexing output signals from the I/O bus manager and a demultiplexer for demultiplexing input signals from the I/O cluster units, the multiplexing/demultiplexing functions provided by a controller area network (CAN) integrated circuit. Each I/O cluster unit includes a multiplexer for multiplexing input signals from the I/O devices and a demultiplexer for demultiplexing output signals from its associated network node, the multiplexing/demultiplexing functions again provided by a controller area network (CAN) integrated circuit. Each I/O cluster unit provides means for manually requesting address assignments and a visual indication of addresses so assigned. Each I/O cluster unit also provides means to manually reject the address assigned to it by the I/O bus manager if the assigned address is not the expected address for the I/O cluster processor defined in the connectivity map.

None of above described documents provide for solutions according to the present invention.

SUMMARY OF THE INVENTION

The main object of the present invention is to provide an arrangement that enables coupling, controlling and/or monitoring a number of controllable devices, preferably of different types, via a single bus, in a simple but yet efficient way.

The advantageous of the arrangement according to the invention include:

- possibility of monitoring and controlling all devices from a computer unit, such as a PC;
- re-addressing device identities of each controlled device to generate new control combinations from different switches;
- cost reduction for installation of cables, wires, fuses and other security arrangements,
- possibility of reducing signal conversions,
- reduced installation time,
- reduced installation weight,
- simple installation planning, since all devices are connected to one bus and addressed later.

It is also possible to combine operation indications on the same bus that is used, for example to broadcast the result of a switch actuations, which substantially reduces the amount of cables, while allowing a combined monitoring and safety function at each output.

For these reasons, the initially mentioned arrangement comprises at least one input member and at least one output member interconnected through said common bus, each input and output member having at least one input terminal and at least one output terminal, respectively. Each input/output terminal having an unique identity, said input member being arranged to receive a control signal from at least one control arrangement connected to said at least one input terminal of said input member. The control signal generates an action signal comprising an address corresponding to an unique identity of an output terminal of said output member connected to at least one of said controllable devices. The action signal is provided on said common bus by said input member to be received by said output member.

Preferably, said bus is a CAN-bus, which is a well-defined standard.

In a preferred embodiment, the input member comprises a control unit, a bus controller, bus driver, memory unit and an input signal controller. The controller unit consist of a microprocessor or other data processing arrangement. Thus, the bus controller is a CAN-bus controller and the bus driver is a CAN-bus driver.

In a preferred embodiment, said output member comprises a control unit, a bus controller, bus driver, memory unit and an output signal controller. The controller unit consist of a microprocessor or other data processing arrangement. Thus, the bus controller is a CAN-bus controller and the bus driver is a CAN-bus driver.

To reduce the number of lines, the inputs of the input member module are so provided that their input/output terminals shift between input and output. The inputs are arranged for reading an input value and at same time outputting a signal for driving one of said devices. Each input is connected to a normally open or normally closed switch, which state is determined by programming the control unit. Function modes of the inputs are determined to bistable or pulse.

In one embodiment, outputs are arranged such that they allow tuning a current limitation for each individual output. Advantageously, all members are power supplied through a common power supply and said common power supply is arranged as a loop. The common power supply is connected to a power supply at each end. As a protection, the common power supply is provided with means to detect an excess-current.

The input/output member comprises a number of input/output terminals and at least one of said input/output terminals is arranged as a common signal terminal. The common signal has different states, determining different states for said input terminal.

Moreover, in a most preferred embodiment, the common bus is used to communicate control commands and status messages between said input and output member, which reduces the number of connections.

Advantageously, several input members are connected to switch and indicator groups, which are interconnected by means of a common signal line.

The invention also relates to a method of controlling a plurality of devices connected to at least one common bus, the method comprising: arranging at least one input member and at least one output member, each input and output member having at least one input terminal and at least one output terminal each having an unique identity and each input and output member communicating through said common bus, arranging said input member to receive a control signal from at least one control arrangement connected to said input terminal of said input member, upon reception of said control signal generating an action signal comprising an address corresponding to an unique identity of said output terminal connected to at least one of said controllable devices, providing said action signal on said common bus by said input member to be received by said output member connected to at least one of said controllable devices.

BRIEF DESCRIPTION OF THE DRAWINGS

In the following, the invention will be further described in non-limiting way with reference to the accompanying drawings in which.

DETAILED DESCRIPTION OF THE EMBODIMENTS

The present invention relates to a method and an arrangement, and more specially a system comprising an intelligent connection arrangement, preferably in form of a bus loop, which allows connecting a number of controllable devices to the control units. Each connected object is then provided with an unique address. A controller unit, preferably a microprocessor controlled controller unit, is arranged between the bus and each object to be controlled.

Figure 1:
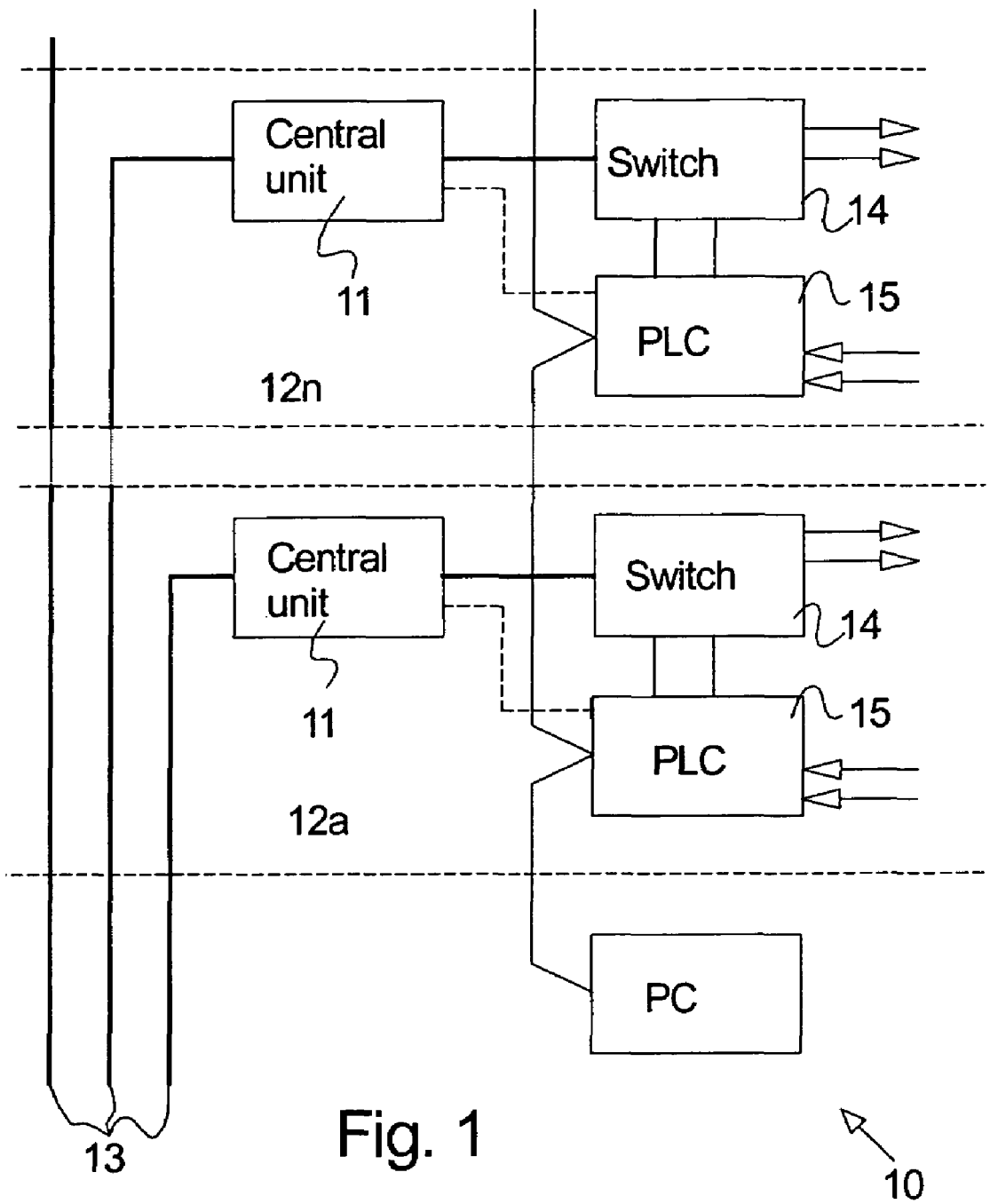
FIG. 1 schematically illustrates an example according to prior art.
Figure 2:
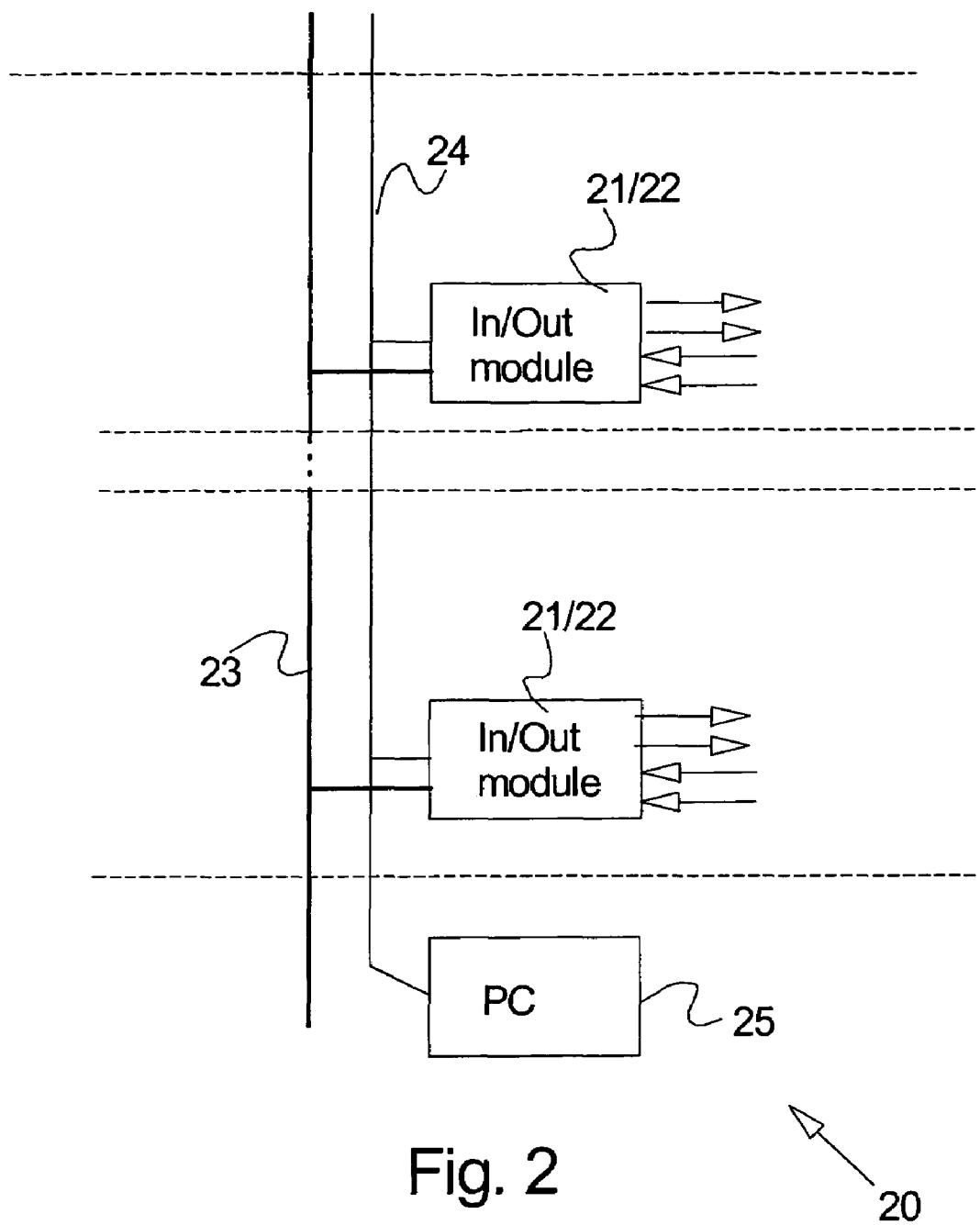
FIG. 2 is a block diagram illustrating system architecture according to the present invention.

In the schematic block diagram of FIG. 2, a system 20 according to the invention is illustrated. The system comprises IN and OUT modules 21 and 22, control bus 24, supply-line 23, and a computer unit 25. Each module is connected to the control bus 24 and supply line 23. The control bus is arranged as loop, which begins and terminates in the computer unit 25.

The IN/OUT modules may consist of two different modules; in a preferred embodiment, however, both are arranged in same module with several functionalities.

Figure 3:
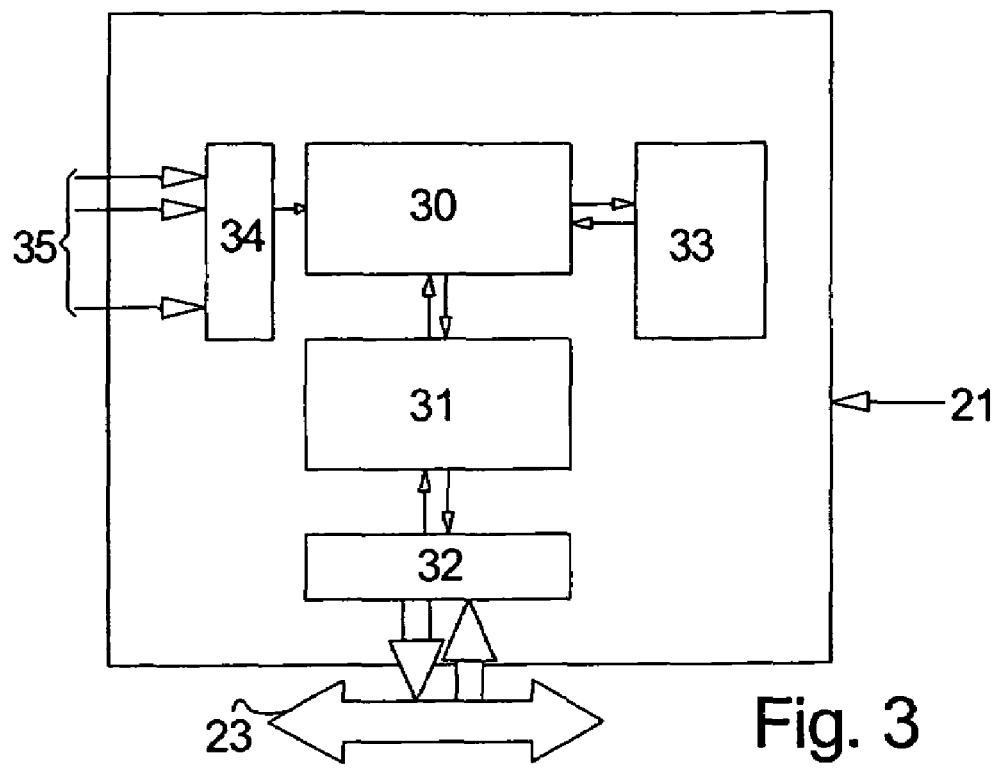
FIG. 3 is a block diagram illustrating an input module according to the present invention.

The IN module 21, as shown in FIG. 3 mainly comprises a control unit 30, a bus controller 31, bus driver 32, memory unit 33 and an input signal controller 34. The controller unit 30 may consist of a microprocessor or other data processing arrangement. Moreover, the control unit 30 and controller 31 can be integrated in same unit. In case a CAN-bus (Controller Area Network) is used, the bus controller is a CAN-bus controller and the bus driver is a CAN-bus driver. The memory unit may comprise of a RAM (Random Access Memory), Programmable Read Only Memory (PROM), EPROM, EEPROM etc. Clearly, other bus types can be employed, however, the CAN-bus is preferred because of its standardization and extend of use.

The bus controller is connected to and controlled by the controller unit. The bus controller transmits the control signals received from the control unit over the bus to devices to be controlled. The input signal of the IN-module may include ON/OFF, adjustment, tuning or similar commands from switches, device drivers, detectors etc.

The input of the module is so provided that a simple inline signal, e.g., for operation and/or alarm indication can be received. Thus, the number of wires to switches especially in large switch panels will be reduced. In traditional installations, usually a common feed or ground is connected to all switches or indicators (lights, LEDs, etc.); then a separate signal line for operation and alarm line is arranged; consequently four cables, i.e., three for each switch and one common cable have been used. Thus, for a panel having ten switches, 31 cables are required. However, according to the invention the number of cables for the same panel is reduced to 11.

When an input is assigned, as "Out", in some applications, it is possible to "soften" or dimmer the signal when for example softening of lights or indicators is required. For this purpose, e.g. PWM control can be used. This solves many problems related to transmission of dimmer signal via a common cable through circuit breakers, switches and so on. The dimmer function is usually used in marina applications to not deteriorate night vision. A normal installation having light indicators is usually divided into different fuse groups, which makes dimmering of several equipments using same dimmer-signal difficult, because the equipments are in different groups. Thus, it is not possible to inter-connect them in a common dimmer line provided that the groups are not galvanically isolated and provided with a dimmer for each group. According to the invention, the problem is solved by controlling the dimmer function through the bus and thus independent of the fuse groups.

In the module, each input can be connected to a normally open or normally closed switch, e.g. by programming the control unit. It is also possible to affect the function mode of the inputs to bi-stable or pulse, e.g. when using non-locking switches. This allows connecting any type of switches to the module.

The memory unit 33 can be used to save the settings, also during a power failure. The saved settings can be changed by means of the computer unit 25 via the CAN-bus. This allows for a flexible system, which can be adapted to the needed application.

Figure 4:
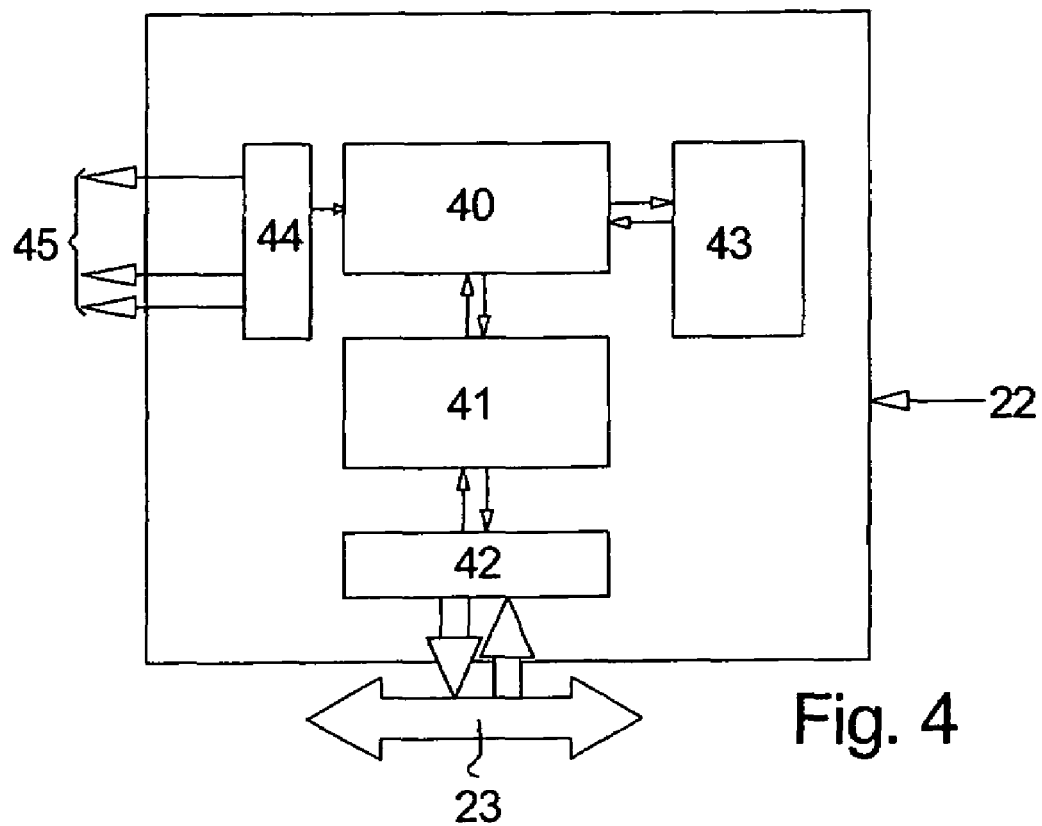
FIG. 4 is a block diagram illustrating an output module according to the present invention.

The OUT module 22 as shown in FIG. 4 mainly comprises a control unit 40, a bus controller 41, bus driver 42, memory unit 43 and an output signal controller 44. The controller unit 40 may consist of microprocessor. In case a CAN-bus is used, the bus controller is a CAN-bus controller and the bus driver is a CAN-bus driver. Moreover, the controller unit and the bus controller can be integrated in same unit. The memory unit may comprise of a RAM (Random Access Memory), Programmable Read Only Memory (PROM), EPROM, EEPROM etc. The output signal controller may consist of drivers, transistors or the like.

The outputs 45 of the module 22 can be arranged such that they allow tuning current limitation for each individual output. This action will reduce the number of fuses and also the number of cables since it prevents exceeding the adjusted current limit.

The different current levels can be sat by means of programming, which also allows setting an operation current and an upper current limit. The operation current implies the current level consumed by a device connected to the output. When the operation current level is reached, the switch that actuates the device can be provided with a signal and the operation start is indicated (for example a fan is started), e.g. by means of a LED. The connected devices can be arranged to feedback to the actuating switch arrangement, including the indicator, via the Out-module, as a result of reaching operation current level. The non-operation is indicated, e.g. by switching off the LED, if the level is underpassed.

The memory unit 44 is used to save the settings, e.g. in case of a power failure.

Both the IN and OUT modules can be supplied through a common supply-line, in which case the supply-line can be arranged as a loop. In an alternate embodiment, each module can be supplied through one (fused) line, which is connected at each end to power supplies. In the latter case, if an interrupt in the common line occurs, the system is not affected since the modules are supplied from two terminals.

However, if an excess-current occurs in the system, both supply-lines will be interrupted since both lines are indirectly in parallel. Using an excess-current module can eliminate this problem. The excess current module is normally arranged in series with the voltage-supply. When an excess current is sensed, the module cuts the power of one line while the parallel line continues supplying the modules. In case of an excess-current, the module can generate an alarm-state (signal) over the bus to an operator or monitoring centre. The excess-current level is adjustable and can be adjusted to a suitable release level.

The computer unit 25 is arranged, among others, for programming the modules. However, a separate programming unit can be used. The programming unit or the computer is arranged with a bus-interface, depending on the bus type, and can be arranged permanently in the installation or attached to it when needed In the following, two examples are disclosed for simplifying the understanding of the invention.

According to one preferred embodiment of the invention, the inputs of the modules are so provided that they shift between input and output. It allows both reading an input value and at same time outputting a signal for deriving a device, such as an alarm indication or the like. In this case a common signal is connected between the actuators and indicators. Table 1 represents an example of the control states.

TABLE 1

| COMMON | I/O-port | | Status |
|---|---|---|---|
| In | Shift channels one by one 0/1 | | Read common signal for indicating an input signal |
| 1 | Out | 0 | Operation indication activated Alarm indication deactivated |
| | | 1 | Operation indication deactivated Alarm indication deactivated |
| 0 | Out | 0 | Operation indication deactivated Alarm indication activated |
| | | 1 | Operation indication deactivated Alarm indication deactivated |

Hence, the status of the common signal is read. As an example, when an I/O port of channel 1 is sat to logical 1, the value of the common signal is read; if a switch is actuated a logical 1 is transmitted on the bus, because it is assumed as an input in this instance. If the switch is not actuated, the value is a logical 0. When this is done, the common signal is shifted to output mode. When the status of the common signal is logical 0 and the I/O port for the controlled channel is logical 0 or 1, according to Table 1, Operation indication deactivated and Alarm indication activated, and Operation indication deactivated and Alarm indication deactivated, respectively. The same result is obtained for a logical 1 on the common signal. However, the polarity of the signal is redirected, which results in a parallel reversed coupled indicator to be controlled depending on the value of the I/O port.

Figure 5:
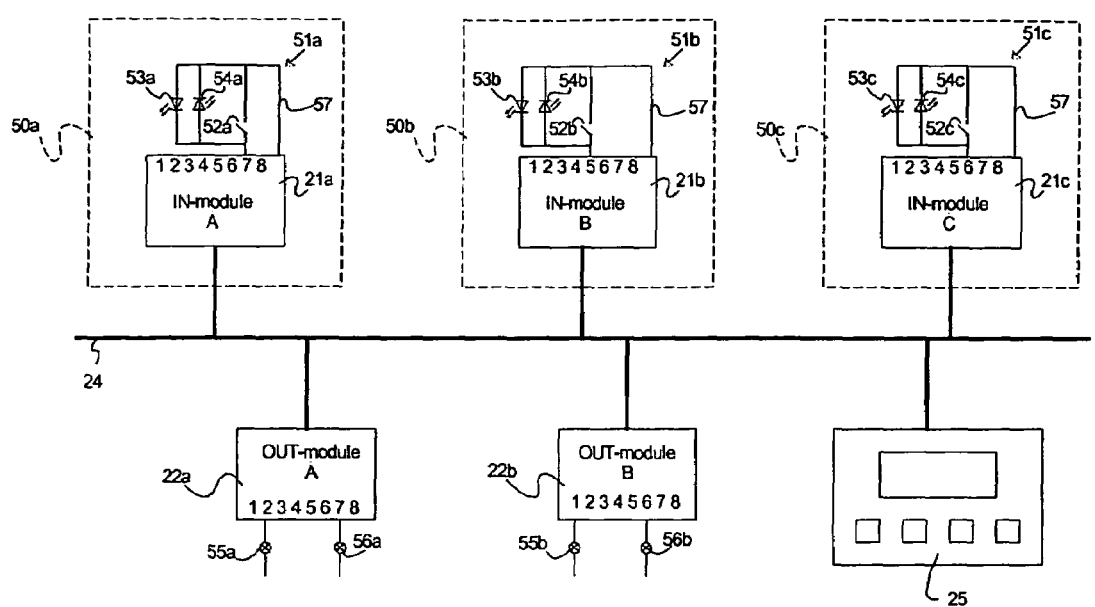
FIG. 5 is a block diagram illustrating a detailed system according to the present invention.

The first exemplary embodiment is shown in FIG. 5. The system comprises a number of IN-modules, 21a–21c, arranged in manoeuvre locations 50a–50c, a number of OUT-modules 22a–22b, a programming unit 25 and a communication bus 24. The common signal line is denoted with 57.

For each manoeuvre location, which for example can be an instrument panel or the like, a control arrangement 51a-51c is arranged. Each control arrangement comprises a switch 52a (-52c), indicators 52a (-52c) and 53a (-53c), respectively. The indicator group 53 is arranged for indicating operation state and the indicator group 54 for indicating an alarm or warning state. In this example, each IN-module comprises eight inputs, numbered 1 to 8. The control arrangements are interconnected with common signal line 57. The control arrangements are connected to one or several inputs of each module; thus, the control arrangement 51a is connected to input 7 of IN-module A (IA7), control arrangement 51b is connected to input 5 of IN-module B (IB5) and control arrangement 51c is connected to input 6 of IN-module C (IC6).

The number of modules and inputs/outputs are given as an example and can be varied depending on the application.

The OUT-module comprises eight outputs numbered 1 to 8. Each OUT-module is connected to devices to be controlled. The output number 2 of OUT-module A (OA2) is connected to a light bulb 55a, the output number 7 of OUT-module A (OA7) is connected to an indicator 56a, the output number 1 of OUT-module B (OB1) is connected to a device 55b, and the output number 6 of OUT-module B (OB6) is connected to a siren 56b.

The number of inputs and outputs are of course variable.

When switch 52a is actuated, the IN-module A senses the current flow through the close circuit and the controller of the module generates a message corresponding to the actuation of IA7 and transmits on the bus 24. The IA7 is interoperated as an address to a device, for example the light 55a. The OUT-module A scans the bus for messages having its address. Assuming that IA7 is a generated address corresponding to the actuation of output OA2, the OUT-module an upon reception of the message having address IA7 will generate a control signal which short circuits the supply to output OA2 and the light is turned on.

For addressing, each input can be programmed to activate one or more outputs. Accordingly, an input, e.g. 52a, is programmed to activate addresses OA2 and OA7. The number of inputs and outputs to be controlled and their function, i.e. being controllable or permanently active, is optional and can be determined when the installation started and programmed.

The common signal is used to control the indicators, e.g. 53a and 54a, and sense the signal from the switch 52a. Thus, the common signal in one state, e.g. 0 V drives one the indicators and in another state, e.g. 5 V, the other indicator, when for example an alarm must be indicated. The alarm state may be resulted due to function disturbance in one of the outputs, e.g. when the device 55a does not function.

Also, lamps and switches are illustrated in the drawings, it is clear that other devices such as pumps, engines, engine units etc. can be connected to the input and output modules. The alarm function may be substituted with other functions, such as driving a pump, an engine etc.

Figure 6:
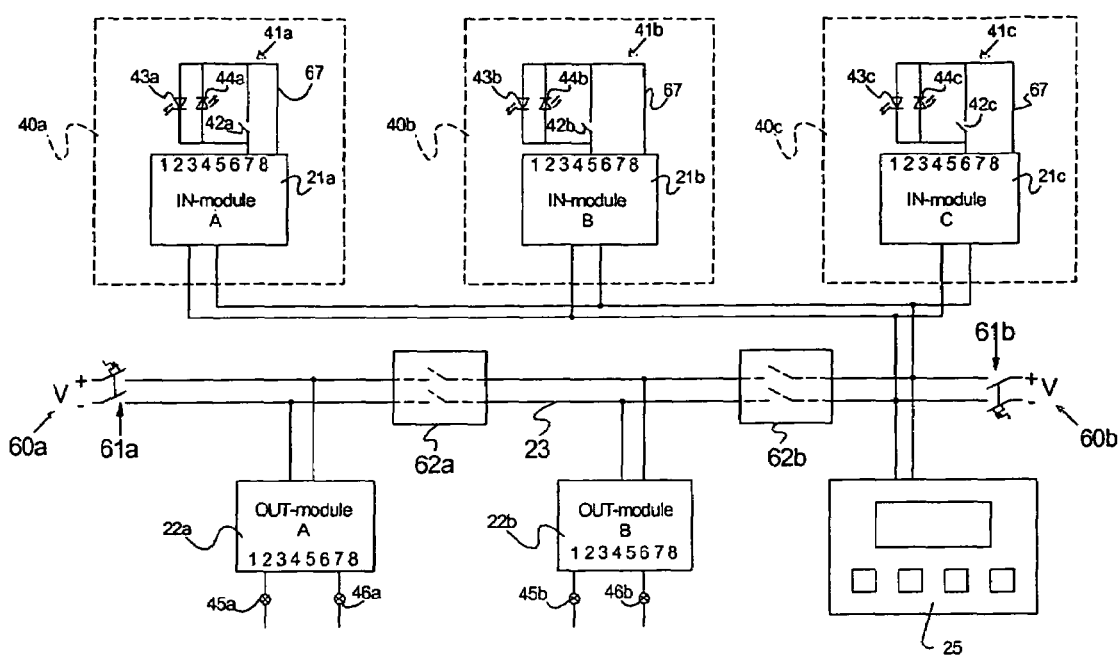
FIG. 6 is a block diagram illustrating a detailed power supply arrangement in system according to the present invention.

In the example of FIG. 5, it is assumed that one common supply-line (not shown) is used. In the embodiment of FIG. 6, a common supply line 23 is also used. A common signal line is denoted with 67. In this case, however, the supply line is connected to a power supply 60a and 60b at each end through fuses (optional) 61a and 61b. As described above, to be able to secure the system against excess-current, the supply line is provided with a number of excess-current modules 62a and 62b between the modules. The supply-line is supplied at both ends with same DC voltage. In many applications such as offshore applications, the voltage supply is 24 V.

The invention can be used in any type of installations, wherein a number of devices are (remotely) controlled. However, due to the reduced number of cables and connections, and thus the reduced weight the invention is very suitable for installations within vessels of any type such as cars, aeroplanes, ships etc., but also industrial installation, block of offices and other sites will enjoy the benefits of the invention.

The invention is not limited the shown embodiments but can be varied in a number of ways without departing from the scope of the appended claims and the arrangement and the method can be implemented in various ways depending on application, functional units, needs and requirements etc.

I claim:

1. A network arrangement comprising:

at least one common bus, an input member connected to said common bus associated with a processing node,
an output member connected to said common bus associated with said processing node,
said input member comprises at least one input contact defined with a unique identity,
said output member comprises at least one output contact defined with a unique identity,
said input member being adapted to receive an input signal through said at least one input contact,
said output member being adapted to provide an output signal through said at least one output contact,
wherein said input member is arranged to generate an action signal transmitted over said bus from said input member to said output member, said action signal comprising an address corresponding to said unique identity of an output contact
wherein said output member is arranged to monitor said common bus, and upon reception of a signal corresponding to a unique identity of one of its output terminals output a signal to said terminal.

2. The arrangement of claim 1, wherein said common bus is a CAN-bus.

3. The arrangement of claim 1, wherein said input member comprises a control unit, a bus controller, bus driver, memory unit and an input signal controller.

4. The arrangement of claim 3, wherein the controller unit consists of a microprocessor or other data processing arrangement.

5. The arrangement of claim 3, wherein said bus controller is a CAN-bus controller and the bus driver is a CAN-bus driver.

6. The arrangement of claim 1, wherein said output member comprises a control unit, a bus controller, bus driver, memory unit and an output signal controller.

7. The arrangement of claim 6, wherein the controller unit consists of a microprocessor or other data processing arrangement.

8. The arrangement of claim 6, wherein said bus controller is a CAN-bus controller and the bus driver is a CAN-bus driver.

9. The arrangement of claim 1, wherein said at least one contact of the input member is so provided that they alter between an input and output contact state.

10. The arrangement of claim 9, wherein said input/output member comprises a number of input/output contacts and at least one of said input/output contacts is arranged as a common signal contact.

11. The arrangement of claim 10, wherein said common signal has different states, determining different states for said input contact.

12. The arrangement of claim 9, wherein each input contact is connected to a normally open or normally closed switch, which state is determined by programming a control unit.

13. The arrangement of claim 9, wherein said states of said input contact are determined to bistable or pulse.

14. The arrangement of claim 1, wherein said at least one contact of output member is arranged such that it allows tuning a current limitation for said at least one output contact.

15. The arrangement of claim 1, wherein said input and output members are connected to a common power supply line.

16. The arrangement of claim 15, wherein said common power supply line is arranged as a loop.

17. The arrangement of claim 15, wherein said common power supply line is connected to a power supply arrangement at each end.

18. The arrangement of claim 17, wherein said common power supply line is provided with an arrangement for detecting an excess-current.

19. The arrangement of claim 1, wherein said common bus is used to communicate control commands and status messages between said input and output members.

20. The arrangement of claim 1, wherein input members are connected to switch and indicator groups, which are interconnected by means of a common signal line.

21. A method of controlling a plurality of controllable devices interconnected through at least one common signaling bus, the method comprising:
arranging at least one input member and at least one output member associated with a node, each input and output member having at least one input contact and at least one output contact and each contact having an unique identity and each input and output member communicating through said common bus,
arranging said input member to receive a control signal from at least one control arrangement connected to said input contact of said input member,
upon reception of said control signal generating an action signal comprising an address corresponding to an unique identity of said output contact connected to at least one of said controllable devices, and
providing said action signal on said common bus by said input member to be received by said output member connected to at least one of said controllable devices.

* * * * *